No. 698,298. Patented Apr. 22, 1902.
M. S. LOGAN.
MUSIC MARKING AND READING INSTRUMENT.
(Application filed May 18, 1901.)
(No Model.)
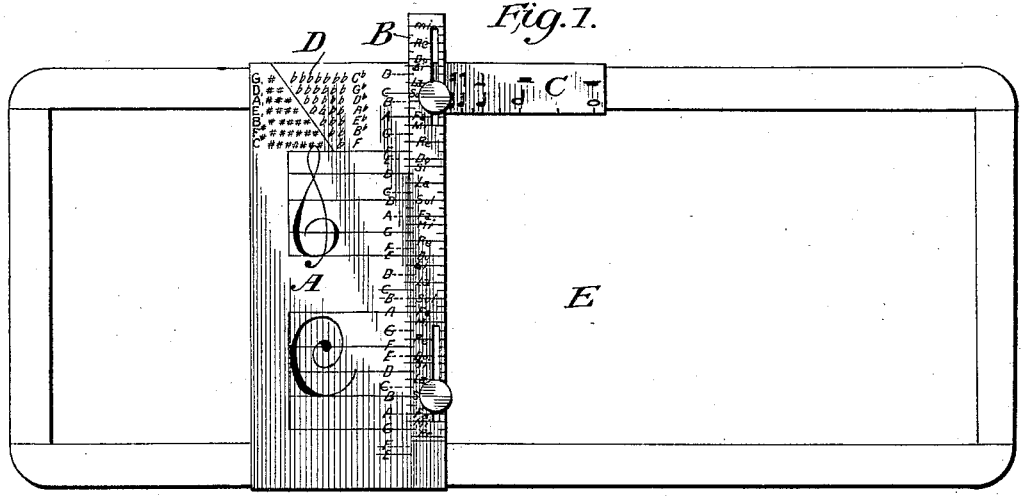
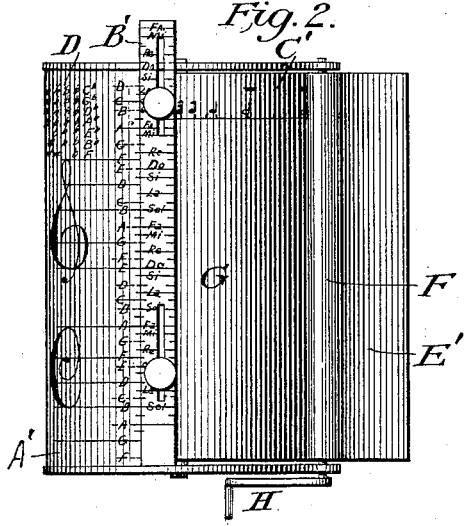
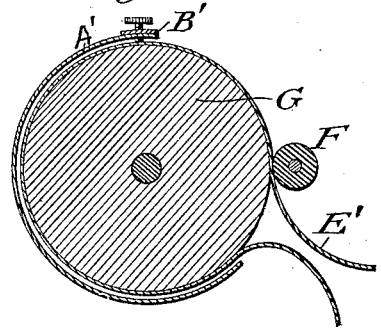
Witnesses:
Joseph Broich
Chas. S. Nyman
Inventor:
Maurice Samuel Logan

UNITED STATES PATENT OFFICE.

MAURICE SAMUEL LOGAN, OF NEW YORK, N. Y.

MUSIC MARKING AND READING INSTRUMENT.

SPECIFICATION forming part of Letters Patent No. 698,298, dated April 22, 1902.

Application filed May 18, 1901. Serial No. 60,963. (No model.)

*To all whom it may concern:*

Be it known that I, MAURICE SAMUEL LOGAN, a citizen of the United States, residing at New York city, in the county of New York and State of New York, have invented a new and useful Improvement in Music Marking and Reading Instruments, of which the following is a specification.

My invention relates to improvements in self-instructors for reading music; and the objects of my improvement are, first, to embrace the theory of music in one complete object-lesson by means of a chart; second, to enable the learner to mark the position and time of the notes; third, to automatically read the music. I attain these objects by the mechanism illustrated in the accompanying drawings, in which—

Figure 1 is a face view of one form of the instrument, consisting of the chart in combination with a slate or other marking surface. Fig. 2 shows the instrument in a cylindrical form, in which the paper or other marking surface is carried on a roller. Fig. 3 is a cross-section of Fig. 2 across the middle.

Similar letters refer to similar parts throughout the several views.

The chart A, Fig. 1, or A', Figs. 2 and 3, has lines and dotted lines alternately drawn on its face. Said lines and dotted lines are marked with the scale-letters and are so spaced as to represent the intervals of the diatonic scale of C-major. The extended portions of said lines are also marked with the bass and treble clefs. Short marks are also drawn between the proper lines and dotted lines to represent the sharp and flat tones of the scale. The said chart is also provided with an adjustable key-strip B, Fig. 1, or B', Figs. 2 and 3. Said key-strip has lines drawn across its face, which are so spaced as to represent the major-key combination of intervals (corresponding to the intervals of the diatonic scale of C-major) and marked with the syllables representing said intervals. Said chart is also provided with an arm C, Fig. 1, or C', Fig. 2, at right angles and marked with the kinds of notes and rests as regards time. Said chart is also provided with a key-table D, showing the number of sharps or flats in each key. If the key-strip B is set so that "Do" stands opposite C, all the letters and syllables will match, showing that no sharps or flats are required in the key of C. When "Do" is set opposite any other mark, then those letters which fail to match the syllables are to be sharped or flatted, according as the key is in sharps or flats. The key-strip B may have the key-numerals marked on it instead of the syllables, or the numerals and syllables may both be marked on the same strip, if desired.

To adjust the chart to the key in which any piece of music is written, first count the sharps or flats at the beginning of the music. Then find the same number in the key-table D. The letter opposite will be the key-letter. Then set the key-strip B so that "Do" will stand opposite the key-letter. The syllables will then match the letters, except the letters which are to be sharped or flatted.

E, Fig. 1, or E', Figs. 2 and 3, is the marking-surface. In marking a piece of music each mark is made with a pen or pencil on the marking-surface at the edge of the chart, so that it will have the same position with reference to the chart as the corresponding note has in the music. Then a mark is made just under the note on the arm of the chart, which represents the time. Then the chart or the marking-surface is moved till the latter mark comes to the edge of the key-strip. The next note is then marked in the same manner, and so on, to the end of the music.

To read the music after it is marked, the chart A is made to pass over the marked surface E, or said surface is made to pass under said chart. Then as each mark passes under the edge of the chart the key-strip B gives the name of the corresponding note, and if the motion is uniform the spaces between the marks will give the correct relative time of the corresponding notes. In the form shown in Fig. 1 the chart A may be made to slide over the marking-surface E, or said surface may be made to slide under said chart. In Figs. 2 and 3 the marking-surface E' passes under the small roller F around the large roller G. The crank H, Fig. 2, rotates the small roller F, which in turn rotates the large roller G. A more regular and uniform motion is thus imparted to the marking-surface E' than could be obtained by drawing said surface through, and therefore gives more accurate time in reading the music.

What I claim as my invention, and desire to secure by Letters Patent, is—

The chart having lines and dotted lines alternately drawn on its face, said lines and dotted lines being marked with the scale-letters and so spaced as to represent the intervals of the diatonic scale of C-major and having the extended portions of said lines marked with the bass and treble clefs, and having short marks drawn between the proper lines and dotted lines to represent the sharp and flat tones of the scale, said chart being provided with a key-strip having lines drawn across its face and so spaced as to represent the major-key combination of intervals and marked with the syllables representing said intervals, said chart being provided also with the arm at right angles and marked with the kinds of notes and rests as regards time, said chart also being provided with a key-table D, in combination with the marking-surface and suitable means for holding said marking-surface in position relative to said chart and admitting relative movement of said surface endwise past and underneath the face of said chart substantially as shown and described.

In testimony whereof I have signed my name to this specification, in the presence of two subscribing witnesses, this 30th day of April, 1901.

MAURICE SAMUEL LOGAN.

Witnesses:
JOSEPH BRAICH,
CHARLES S. NYMAN.